(12) United States Patent
Delamarche et al.

(10) Patent No.: US 9,745,949 B2
(45) Date of Patent: Aug. 29, 2017

(54) MULTILAYER MICROFLUIDIC PROBE HEAD WITH IMMERSION CHANNELS AND FABRICATION THEREOF

(75) Inventors: Emmanuel Delamarche, Rueschlikon (CH); Govind Kaigala, Rueschlikon (CH); Robert Lovchik, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 868 days.

(21) Appl. No.: 13/881,989

(22) PCT Filed: Oct. 18, 2011

(86) PCT No.: PCT/IB2011/054614
§ 371 (c)(1),
(2), (4) Date: Sep. 3, 2013

(87) PCT Pub. No.: WO2012/056369
PCT Pub. Date: May 3, 2012

(65) Prior Publication Data
US 2013/0333761 A1    Dec. 19, 2013

(30) Foreign Application Priority Data
Oct. 29, 2010    (EP) .................................... 10189469

(51) Int. Cl.
*F03B 11/00*    (2006.01)
*B01L 3/00*    (2006.01)

(52) U.S. Cl.
CPC ........ *F03B 11/00* (2013.01); *B01L 3/502707* (2013.01); *B01L 3/502776* (2013.01);
(Continued)

(58) Field of Classification Search
CPC . B01J 19/0046; B01J 19/0093; B01L 3/0241; B01L 3/502702; B01L 2300/874;
(Continued)

(56) References Cited

U.S. PATENT DOCUMENTS 5,872,010 A * 2/1999 Karger ................. B01J 19/0093
204/451
5,882,465 A 3/1999 McReynolds
(Continued)

FOREIGN PATENT DOCUMENTS

CA    2 571 859 A1    2/2006
CN    1772388 A    5/2006
(Continued)

OTHER PUBLICATIONS

Lovchik, et al., "Multilayered mucrofluidic probe heads," Journal of Micromechanics & Microengineering, Institute of Physics Publishing, Bristol, GB, vol. 19, No. 11, Nov. 1, 2009 (Nov. 1, 2009), p. 115006, XP020168801, ISSN: 0960-1317, section 2.1 "Fabrication of MFP heads".
(Continued)

*Primary Examiner* — Brian R Gordon
(74) *Attorney, Agent, or Firm* — Scully, Scott, Murphy & Presser, P.C.; Jennifer R. Davis, Esq.

(57) ABSTRACT

The invention is directed to a microfluidic probe head (100) with a base layer (120) comprising: at least two processing liquid microchannel (123, 124) in fluid communication with a processing liquid aperture (121, 122) on a face of the base layer; and an immersion liquid microchannel (223, 224) in fluid communication with a immersion liquid aperture (221, 222) on a face of the base layer, wherein the microfluidic probe head is configured to allow, in operation, processing liquid provided through the processing liquid aperture to merge into immersion liquid provided through the immer-
(Continued)

sion liquid aperture. An additional layer can be provided to close the microchannels. Such a multilayered head is compact and easier to fabricate than heads made with unitary construction. The head can further be interfaced with tubing using e.g. a standard fitting for tubing port.

7 Claims, 9 Drawing Sheets

(52) U.S. Cl.
CPC ............ *B01L 2200/0636* (2013.01); *B01L 2200/0673* (2013.01); *B01L 2200/0694* (2013.01); *B01L 2200/12* (2013.01); *B01L 2300/0887* (2013.01); *Y10T 137/0318* (2015.04); *Y10T 137/8593* (2015.04)

(58) Field of Classification Search
CPC ......... B01L 2300/887; B01L 3/502707; B01L 3/508; B01L 3/502776; B01L 2200/0636; B01L 2200/0673; B01L 2200/12; B01L 2300/0864; B01L 2300/0867
See application file for complete search history.

(56) References Cited

U.S. PATENT DOCUMENTS

| | | | | |
|---|---|---|---|---|
| 6,001,307 A * | 12/1999 | Naka | .................. | B01L 3/502 422/68.1 |
| 6,440,722 B1 * | 8/2002 | Knapp | .................. | B01L 3/0262 422/68.1 |
| 6,621,076 B1 * | 9/2003 | van de Goor | ........... | H01J 49/04 250/288 |
| 7,025,774 B2 * | 4/2006 | Freeman | ............ | A61B 5/15178 600/583 |
| 7,128,876 B2 * | 10/2006 | Yin | ........................... | B81B 7/00 137/625.46 |
| 7,303,727 B1 * | 12/2007 | Dubrow | ............. | G01N 30/6095 422/50 |
| 7,391,020 B2 * | 6/2008 | Bousse | .................. | B05B 5/025 250/281 |
| 7,473,264 B2 * | 1/2009 | Allen | ................. | A61B 5/15167 606/181 |
| 7,690,325 B2 | 4/2010 | Henderson et al. | | |
| 7,708,950 B2 * | 5/2010 | Yamada | ................. | B01F 5/0646 422/198 |
| 8,852,124 B2 * | 10/2014 | Roe | ..................... | A61B 5/1411 600/584 |
| 9,022,952 B2 * | 5/2015 | Calasso | ................ | A61B 5/1411 600/583 |
| 2003/0099577 A1 | 5/2003 | Renaud et al. | | |
| 2003/0143113 A2 * | 7/2003 | Yuzhakov | .......... | A61B 5/14514 422/420 |
| 2004/0156753 A1 * | 8/2004 | Roitman | .............. | B01J 19/0093 422/504 |
| 2005/0047969 A1 * | 3/2005 | Zhao | ..................... | B01L 3/0268 422/503 |
| 2005/0247673 A1 | 11/2005 | Delamarche et al. | | |
| 2007/0160502 A1 | 7/2007 | Hwang et al. | | |
| 2007/0231458 A1 | 10/2007 | Gale et al. | | |
| 2008/0302960 A1 | 12/2008 | Meister et al. | | |
| 2010/0176089 A1 | 7/2010 | Delamarche et al. | | |
| 2011/0039303 A1 * | 2/2011 | Jovanovich | ............ | B82Y 30/00 435/91.2 |
| 2011/0107822 A1 * | 5/2011 | Bunner | ............. | B01L 3/502792 73/61.52 |
| 2015/0064694 A1 * | 3/2015 | Sadri | ........................ | C12Q 1/24 435/5 |
| 2015/0093816 A1 * | 4/2015 | Lagae | .................. | G01N 27/227 435/287.2 |
| 2015/0132753 A1 * | 5/2015 | Ye | ........................ | F16K 99/0026 435/6.11 |

FOREIGN PATENT DOCUMENTS

| | | | |
|---|---|---|---|
| CN | 101516510 A | | 8/2009 |
| EP | 1 093 855 A2 | | 4/2001 |
| JP | 2002196010 A | | 7/2002 |
| JP | 2004518106 A | | 6/2004 |
| JP | 2005111567 A | | 4/2005 |
| JP | 2005319460 A | | 11/2005 |
| JP | 2007218804 A | | 8/2007 |
| JP | 2008506114 A | | 2/2008 |
| WO | WO 01/74490 A2 | | 10/2001 |
| WO | WO 2006/014460 A2 | | 2/2006 |
| WO | WO 2010/012423 A1 | | 2/2010 |

OTHER PUBLICATIONS

International Search Report, PCT/IB2011/054614.
Local temperature measurement on microfluidic chip having world-to-chip interface, Proceedings of the 2009 JSME Conference on Robotics and Mechatronics,Japan,May 24-26, 2009, "2P1-L13(1)"-"2P1-L13(3)", with English language Abstract.
Robert D Loychik,Ute Drechsler,Emmanuel Delamarche, Multilayered microfluidic probe heads, Journal of Micromechanics and Microengineering, Sep. 29, 2009, vol. 19, Issue 11, Article No. 115006, with English language Abstract.
Great Britain Examination Report dated Jan. 13, 2016 received in related application GB 1308835.6.

* cited by examiner

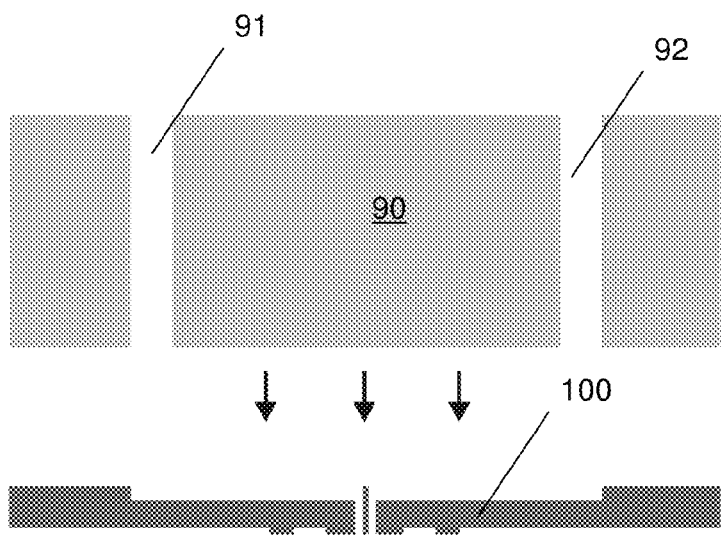
FIG. 1.A
FIG. 1.B
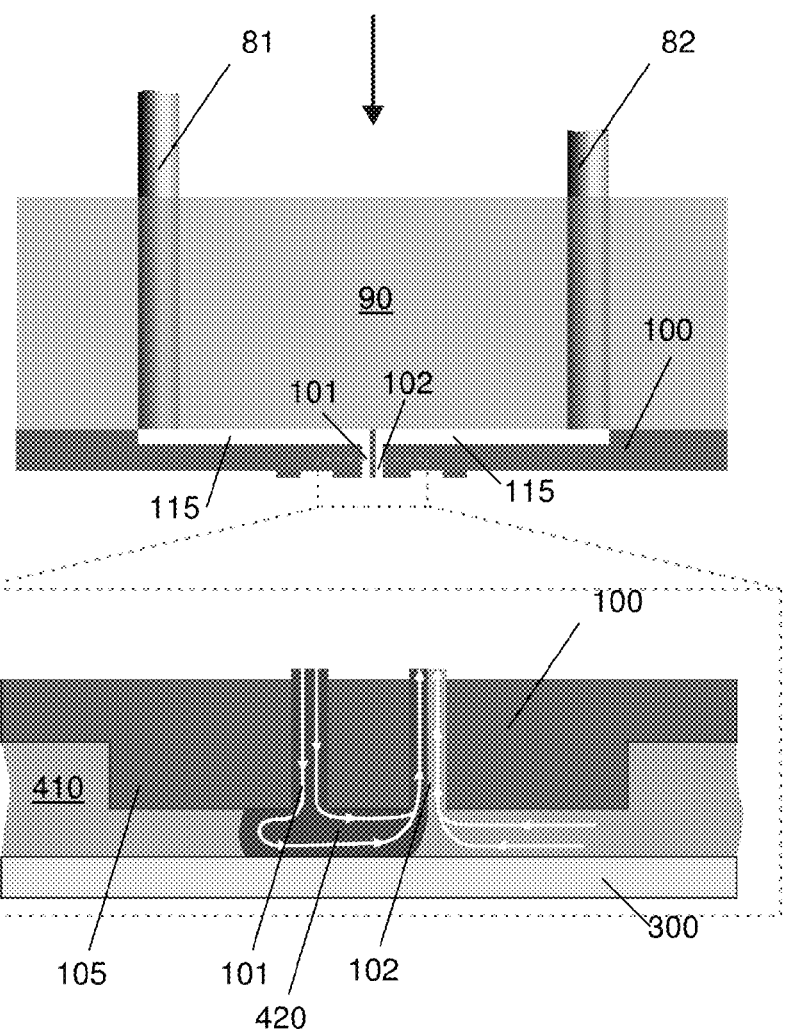
FIG. 1.C
FIG. 1.D

MULTILAYER MICROFLUIDIC PROBE HEAD WITH IMMERSION CHANNELS AND FABRICATION THEREOF

FIELD OF THE INVENTION

The invention relates in general to the field of microfluidic probe devices, and in particular, to a microfluidic probe head and a method of fabrication thereof.

BACKGROUND OF THE INVENTION

Microfluidics generally refers to microfabricated devices, which are used for pumping, sampling, mixing, analyzing and dosing liquids. Prominent features thereof originate from the peculiar behavior that liquids exhibit at the micrometer length scale.[1, 2] Flow of liquids in microfluidics is typically laminar. Volumes well below one nanoliter can be reached by fabricating structures with lateral dimensions in the micrometer range. Reactions that are limited at large scales (by diffusion of reactants) can be accelerated.[3] Finally, parallel streams of liquids can possibly be accurately and reproducibility controlled, allowing for chemical reactions and gradients to be made at liquid/liquid and liquid/solid interfaces.[4] Microfluidics are accordingly used for various applications in life sciences.

Most microfluidic devices have user chip interfaces and closed flow paths. Closed flow paths facilitate the integration of functional elements (e.g. heaters, mixers, pumps, UV detector, valves, etc.) into one device while minimizing problems related to leaks and evaporation. However, processing or patterning surfaces with such microfluidics is hard to achieve.

Inkjets were designed which can for instance deliver ink in a non-contact mode but not in the presence of a liquid.[5] Other techniques can further pattern surfaces at even higher resolution but are limited in their ability to operate in a liquid environment.[6, 7] Liquid environments minimize drying artifacts, denaturation of biomolecules, and enable working with living microorganisms.

For patterning surfaces and analyzing samples on a surface in the presence of a liquid environment, several strategies were developed to overcome limitations of closed microfluidics. Some strategies rely on confining liquids near a surface [8, 9] or, still, delivering a precise amount of biomolecules in a well defined region of a liquid.[10] Scanning nanopipettes and hollow Atomic Force Microscopy (AFM) probes were also developed for patterning biomolecules on surfaces with micrometer accuracy.[11, 12,13].

As another example, a non-contact microfluidic probe technology (or "MFP") was developed (see e.g. US 2005/0247673), which allows to pattern surfaces by adding or removing biomolecules, create surface density gradients of proteins deposited on surfaces, localize reactions at liquid interphases in proximity to a surface, stain and remove adherent cells on a surface.[14] Other applications have been tested. [15, 16]

FIGS. 1A-D depict such a MFP head 100 and further illustrate its working principle. The part 105 (FIG. 1D) of the head 100 that confines the liquid is a Si chip that has two apertures 101, 102. It is brought close to a substrate 300 of interest. Horizontal microchannels 115 (FIG. 1C) on the other face of the chip 100 link the apertures with vias 91, 92 formed in a poly(dimethylsiloxane) (PDMS) connection block 90, FIG. 1A. Capillaries 81, 82 inserted in the PDMS provide connection between motorized pumps and apertures 101, 102. Therefore, by controlling the flow rate of a liquid 420 injected through one aperture 101 and by reaspirating it from the other aperture 102 (together with some of the immersion liquid 410), confinement of the injected liquid 420 is achieved, FIG. 1D. A such MFP head as assembled is schematically depicted in FIG. 1C.

Although this technology is advantageous in many respects and for a range of applications, challenges remain to be solved in terms of fabrication. In particular, assembling the Si head 100 with the PDMS connection block 90 and inserting the glass capillaries 81, 82 is labor intensive. Such operations also have limited yield because the Si chip and PDMS are small and difficult to handle. In addition, stress in the PDMS block 90 during bonding to the Si head and insertion of the capillaries can lead to the detachment of the PDMS. Moreover, microfabricating small apertures in a thick Si wafer using e.g. deep reactive ion etching (DRIE) or plasma etching, is challenging and time consuming, owing to the thickness that the head must have for e.g. mechanical stability. Such limitations may hinder the industrialized deployment of MFP technology.

Furthermore, confining the injected liquid 420 within an immersion liquid is challenging.

For the sake of completeness, let mention the patent documents US 2007/0160502, JP 2005/111567 and U.S. Pat. No. 5,882,465, dealing with process of fabrication of microfluidic devices or reactors.

Beside the sole patent literature, a number of publications are devoted to the subject, some of which are referenced at the end of the present description.

BRIEF SUMMARY OF THE INVENTION

In one embodiment, the present invention provides a microfluidic probe head with a base layer comprising: a processing liquid microchannel in fluid communication with a processing liquid aperture on a face of the base layer; and an immersion liquid microchannel in fluid communication with a immersion liquid aperture on a face of the base layer, wherein the microfluidic probe head is configured to allow, in operation, processing liquid provided through the processing liquid aperture to combine with immersion liquid provided through the immersion liquid aperture.

In other embodiments, the said probe head may comprise one or more of the following features:
  each of the processing liquid microchannel and the immersion liquid microchannel are open on one or more faces of the base layer;
  at least a portion of the processing liquid microchannel is a groove open on the upper face of the base layer and at least a portion of the immersion liquid microchannel is open on the upper face of the base layer such as to be closable by a lower face of an additional layer;
  the microfluidic probe head further comprises a cover layer, wherein at least portions of the processing liquid microchannel and the immersion liquid microchannel are closed by a portion of a lower face of a layer of the head;
  the processing liquid microchannel and the immersion liquid microchannel each enables fluid communication between an upper face of the base layer and a respective aperture on a face of the base layer;
  the microfluidic probe head further comprises a tubing port extending from an upper face of the cover layer and wherein the cover layer has a via enabling fluid communication between the tubing port and a lower face of the cover layer, wherein the head is further configured to enable fluid communication between the via and one or more of the microchannels;

at least a portion of the processing liquid microchannel is a groove extending up to the processing liquid aperture, the latter arranged at an end of the groove at the level of an edge of the upper face of the base layer;

a characteristic of the processing liquid microchannel and/or of the immersion liquid microchannel changes along said microchannel, preferably continuously;

the microfluidic probe head further comprises thermal elements adapted to heat one or more microchannels;

the microfluidic probe head further comprises a second processing liquid microchannel in fluid communication with a second processing liquid aperture on a face of the base layer; and a second immersion liquid microchannel in fluid communication with a second immersion liquid aperture on a face of the base layer, wherein the head is further configured to allow for aspirating at the second processing liquid aperture some fluid deposited via one or more distinct apertures, in operation;

the microfluidic probe head further comprises/a second immersion liquid microchannel, in fluid communication with a respective second immersion liquid aperture on a face of the base layer, the microfluidic probe head being further configured to allow, in operation, immersion liquid provided through a first immersion liquid aperture to combine with immersion liquid provided through said second immersion liquid aperture;

the microfluidic probe head further comprises two microchannels asymmetrically configured with respect to an average direction of processing liquid deposition by the processing liquid apertures;

two microchannels have distinct flow resistances; and the microfluidic probe head is further configured such that processing liquid provided through a processing liquid aperture and combining with immersion liquid provided through an immersion liquid aperture is essentially laminar.

The invention is further directed, in another embodiment, to a method of fabrication of the microfluidic probe head of the invention, comprising the steps of: providing the base layer; and fabricating the microchannels and apertures in the base layer.

Devices and methods embodying the present invention will now be described, by way of non-limiting example, and in reference to the accompanying drawings.

BRIEF DESCRIPTION OF SEVERAL VIEWS OF THE DRAWINGS

FIGS. 1A-D show an MFP of the prior art and its working principle;

DETAILED DESCRIPTION OF THE INVENTION

As an introduction to the following description, it is first pointed at general aspects of the invention, directed to a microfluidic probe (or MFP) head. At variance with known solutions, immersion liquid microchannels are provided directly on the head, in addition to the processing liquid microchannels, i.e., on a base layer thereof. Each channel is in fluid communication with an aperture arranged on a face of the base layer. Typically, channels are machined on a same face of the base layer, such as to be closed by an additional layer of the head. The microfluidic probe head is further configured to allow, in operation, liquid provided via the processing liquid aperture to merge into immersion liquid deposited via an immersion liquid aperture. For example, the head can further be made acute at an end, i.e., the end where the processing liquid apertures are provided, with the immersion liquid apertures in the vicinity thereof. Providing immersion channels directly on the head, together with the processing channels, results in more compact heads, with smaller footprints.

In addition, the manufacture of microfluidic devices is made easier. One reason is that the same technology can essentially be used to fabricate both the processing and immersion liquid paths, i.e., on a same chip (base layer). Also, a multilayer design can be contemplated. Namely, the head typically comprises an additional cover layer (facing the base layer), and tubing ports. Tubing ports extend from the cover layer, the latter comprising vias facing the ports, whereby fluid communication can be enabled through the cover layer, towards the base layer. There, microchannels relay the fluid communication to apertures on a face of the base layer.

Such a multilayered MFP head is easier to fabricate and to package than heads made with unitary construction, as evoked in the background section. In particular, a microchannel can advantageously be engraved as a groove at the level of the interface between the two layers. The MFP head can further be interfaced with tubing using e.g. a standard fitting for tubing port. The present invention has substantial potential for e.g. patterning continuous and discontinuous patterns of biomolecules on surfaces as well as for direct processing of resist materials in a non-contact mode.

Figure 2:
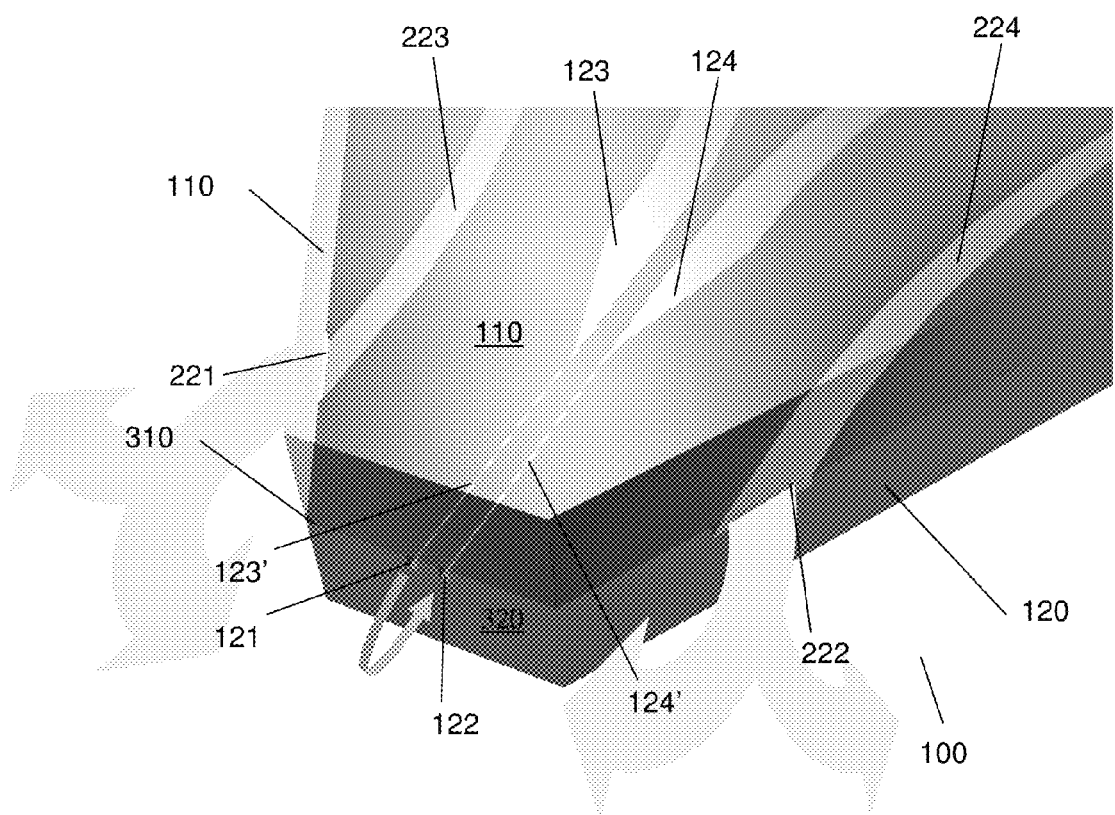
FIG. 2 is a 3D view of the processing end of a MFP head according to an embodiment of the present invention.

FIG. 2 shows a view of the processing end of a multilayer MFP head, according to an embodiment of the invention. As seen therein, the head 100 has a base layer 120, wherein processing liquid microchannels 123, 124 are provided together with immersion liquid microchannels 223, 224. Each channel is in fluid communication with an aperture 121, 122, 221, 222, each aperture located on a face of the base layer (not necessarily the same face), and preferably in close proximity. When moving the head in the vicinity of a surface, processing liquid provided through the aperture 121 will combine with the immersion liquid and preferably inserts into immersion liquid provided via the apertures 221 and 222, as symbolized by the curved (thick) arrows. The latter are provided for the sake of understanding; their dimension are deliberately exaggerated. In this regard, the device is preferably configured such as to get a laminar flow. Apertures' dimensions can e.g., be a few tens of micrometers. They are typically spaced hundreds of micrometers. As pairs of processing channels/apertures are used here, the processing liquid can be re-aspirated at aperture 122 together with some of the immersion liquid. Note that the flow path between apertures 121 and 122 can be inverted, i.e. processing liquid can be injected from aperture 122 while aperture 121 can aspirate liquid. The processing liquid is essentially located nearby the apertures 121 and 122 and is surrounded by an immersion liquid that is essentially present in the vicinity of the head 100.

Preferably, a cover layer 110 closes the channels open on the upper face of the base layer, as depicted. In variants, channels could be provided in the thickness of a unique layer. Such variants are however harder to manufacture.

Figure 3:
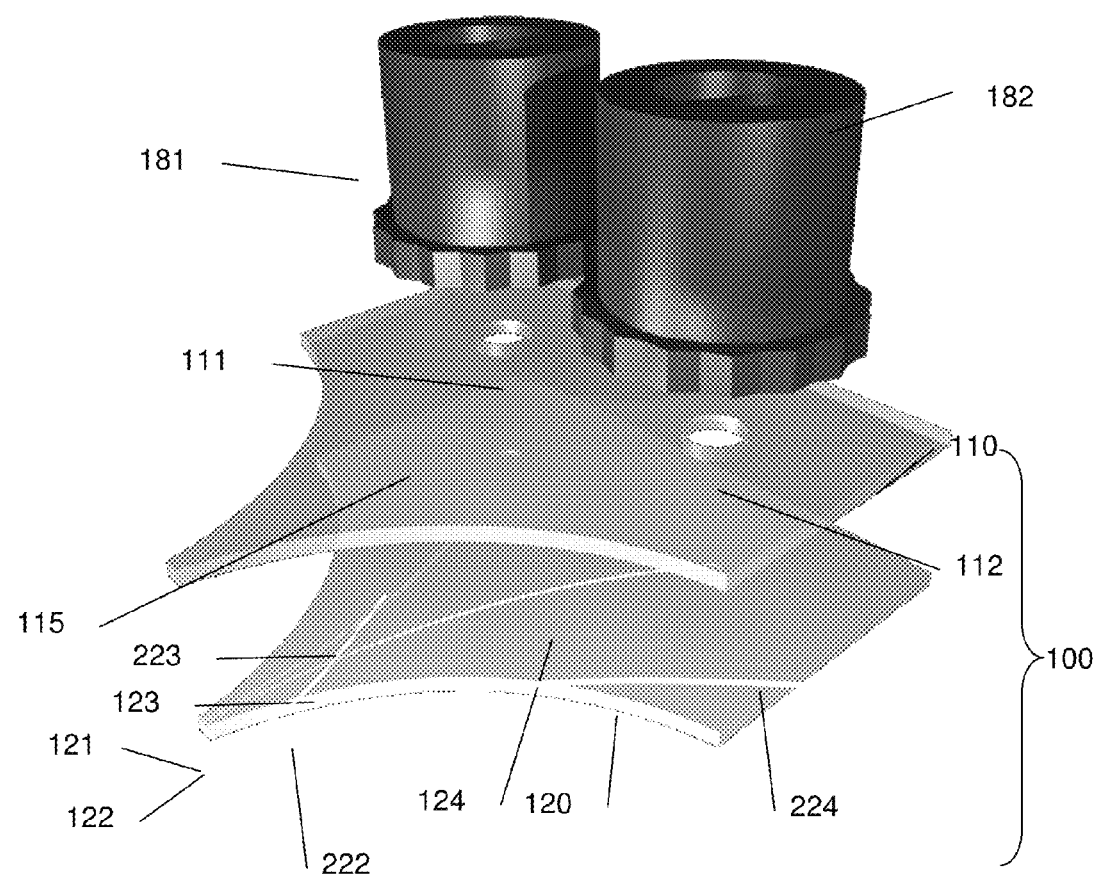
FIG. 3 is an exploded, 3D view of a similar MFP head, with additional features.

FIG. 3 is an enlarged view of a head having a similar processing end as in FIG. 2. The multilayer head 100 still comprises a cover layer 110 and a base layer 120. Again, the base layer 120 has apertures 121, 122, 221, 222, open on a face thereof. Microchannels 123, 124, 223, 224 enable fluid communication from the upper face of the base layer 120 (i.e. facing the lower face of the cover layer 110) to said apertures.

The head is further shown to have tubing ports 181 and 182, extending from the upper face of the cover layer 110 (after assembling the ports and cover layer). The cover layer 110 further comprises vias 111 and 112. As illustrated in the drawing, vias and ports are configured to enable fluid communication from the ports to the lower face of the cover layer 110, i.e. towards the base layer. Corresponding ends of the microchannels shall face the vias. Said ends might for instance have larger dimensions in comparison to an average section of the microchannel. Similarly, one or more additional tubing ports similar to ports 181 and 182 can be provided, together with one or more additional vias to enable fluid communication from the ports to immersion liquid apertures (not shown here, for clarity). Thus, preferred configurations are those where microchannels enable fluid communication from a via (likely large) up to respective apertures which are comparatively small. Apertures 121, 122, 221, 222 are furthermore likely close to each others, for applications that shall be discussed in more details below.

The MFP head of FIG. 2 or 3 is easily fabricated. First, using an additional layer allows for tubing ports to be readily mounted thereon, which is more easily handled than e.g. capillaries in a PDMS block, as discussed in introduction. Second, only the lower layer 120 needs substantial machining for creating microchannels.

In addition, portions of the processing liquid microchannels are preferably provided as grooves 123', 124' in the layer thickness of the base layer 120, open on the upper face thereof. This way, forming a microchannel is easily achieved, in spite of its transverse dimensions (likely small, e.g., a few tens of micrometers). After assembly, the groove is closed by a portion of the cover layer 110. The groove may be engraved by a tool directly on the upper surface of the base layer 120. It can have any appropriate section shape, e.g. rounded, square, U or V section. The required tool is typically chosen according to the material of the base layer 120. In a variant, laser ablation can be contemplated. Most advantageously yet, deep reactive ion etching (DRIE) is used for fabrication of microchannels.

As depicted in FIG. 2 or 3, the grooves 123', 124' extend up to respective apertures 121, 122. Similarly, immersion channels 223, 224 reach respective apertures 221, 224. In this example, channels and apertures are symmetrically arranged around the main axis of the upper face of the head. An aperture is directly formed at an end of the groove at the level of an edge 310 of the front face 320 of the base layer 120, which here again is easily machined. Said front end 320 is typically made acute, which allows for compact liquid deposition on a surface of interest, and leaves rooms for easy optical monitoring.

Possible fabrication schemes comprises two major stages. For example, during a first stage, one fabricates:
  one or more vias in the cover layer, e.g. using DRIE; and
  one or more microchannels in the base layer, e.g. by DRIE.

In the views of FIG. 2 or 3, apertures are directly obtained when cutting the front end 320 of the head. Should other designs be contemplated, apertures can still be formed in the base layer, using DRIE as well. Apertures have typical lateral dimensions of a few tens of micrometers.

Then, a second stage consists of assembling the cover and base layers. The ports are preferably mounted afterwards.

Details of a preferred method of fabrication of the main features of the MFP head are discussed now. A multilayered MFP head such as described in FIGS. 2 and 3 is preferably microfabricated using Si wafers, although other materials can be used. Let call the cover layer 110 the Si lid and the base layer 120 the HFC chip. A single-side and a double-side polished Si wafers are used for the Si and HFC chip, respectively. Both wafers are e.g. 4 inch in diameter and 400 µm in thickness (Siltronix, Geneva, Switzerland).

The microstructures are made using standard photolithography, photoplotted polymer masks (Zitzmann GmbH, Eching, Germany) and DRIE, see e.g. STS ICP, Surface Technology Systems, Newport, UK. The microchannels of the HFC chips can be etched 50 µm deep into the upper face of the HFC wafer. The bottom side of the wafer can be processed to form any desired mesa and/or post to a height of 50 µm, if necessary. Opening the apertures is performed using DRIE etching from the bottom side of the HFC wafer, if necessary. Well defined apertures with lateral dimensions of less than 10 µm can thereby be obtained. The apertures can be more accurately fabricated when a thin Si wafer is used for the HFC chip while the lid wafer can remain thick to provide mechanical strength to the head.

The Si lid is produced by etching vias with a diameter of 800 µm trough a one side polished wafer. Next, assembly of both wafers is achieved by spin coating ~3 µm of a polyimide adhesive (HD Microsystems GmbH, Neu-Isenburg, Germany) onto the polished side of the lid wafer and by subsequently aligning and bonding both wafers. Bonding takes place at 320° C. with 2 bar pressure for 10 minutes (PRESSYS LE, Paul-Otto Weber GmbH, Remshalden, Germany). The MFP heads can then be diced and stored.

Mounting the ports can be carried out using epoxy adhesive rings (Nanoport™ Assemblies from Upchurch Scientific, Ercatech, Bern, Switzerland, epoxy adhesive rings are supplied). The MFP heads can also be mounted with a machined structure which has a slot for a MFP head and within which tubing is coupled to the MFP head (using an o-ring) thereby simplifying the interfacing. The use of standard ports and fittings in place of e.g. molded block of PDMS diminishes labor needed for assembling a head. MFP heads are preferably tested for leakage and clogging before actually mounting the ports, as incursion of adhesive into the microchannels cannot be excluded. In that respect, a disposable pipette tip can be cut to match the size of the vias and liquid can be pushed through the channels while observing with a magnifying glass if droplets are able to exit the apertures without leaking elsewhere. Alignment of the ports with the vias can finally be done manually. A subsequent bonding take place, e.g. at 140° C. for ~1 hour on a hotplate or in an oven.

Reverting briefly to the photolithographic steps, the fabrication of a multilayered MFP head may use three photolithographic steps (coating, exposing and developing a resist followed by etching Si) for the HFC chip and one step for the Si lid. In comparison, monolithic MFP heads as know in the prior art required three steps. The previous heads, however, also required molding a PDMS connection block that needed to be plasma treated and bonded to the Si chip, leading to drawbacks discussed earlier.

In contrast to using a PDMS connection block, the new fabrication method described here yields a Si lid having large vias (e.g. in the range of 1 mm in diameter), which connect structures between the ports and the HFC chip. On the other hand, the HFC chip comprises all microstructures. In particular, microchannels (e.g., on the upper side of the HFC chip) provide fluidic connection between the vias and apertures. Posts around the mesa, if any, can be used as leveling aids when adjusting the MFP head for experiments.

MFP heads such as discussed above are particularly useful notably for surface processing applications. The latter, unlike biological applications, deal with potentially smaller patterns and a broader range of liquids and chemicals. Employing a thin Si wafer (e.g. 100 μm in thickness) to fabricate the HFC chip, one may fabricate well defined apertures with lateral dimensions of less than 10 μm, using conventional DRIE or focused ion beam. The mechanical strength of the head is merely provided by the Si lid.

Incidentally, multilayered heads such as discussed herein are also more amenable to using many processing liquids because apertures can be small and close to each other with horizontal microchannels sufficiently fanning out for leaving sufficient space for adding many ports on the Si lid.

More generally, the present MFP technology has a potential for patterning surfaces, processing materials, depositing and removing biomolecules and cells on surfaces, analyzing cells and biomolecules on surfaces, creating chemical gradients on surfaces, studying complex biological specimens such as tissue sections, and creating structures with unusual profiles such as tapered cavities.

Other embodiments of a multilayer head shall now be discussed in reference to FIGS. 4-11.

Figure 4:
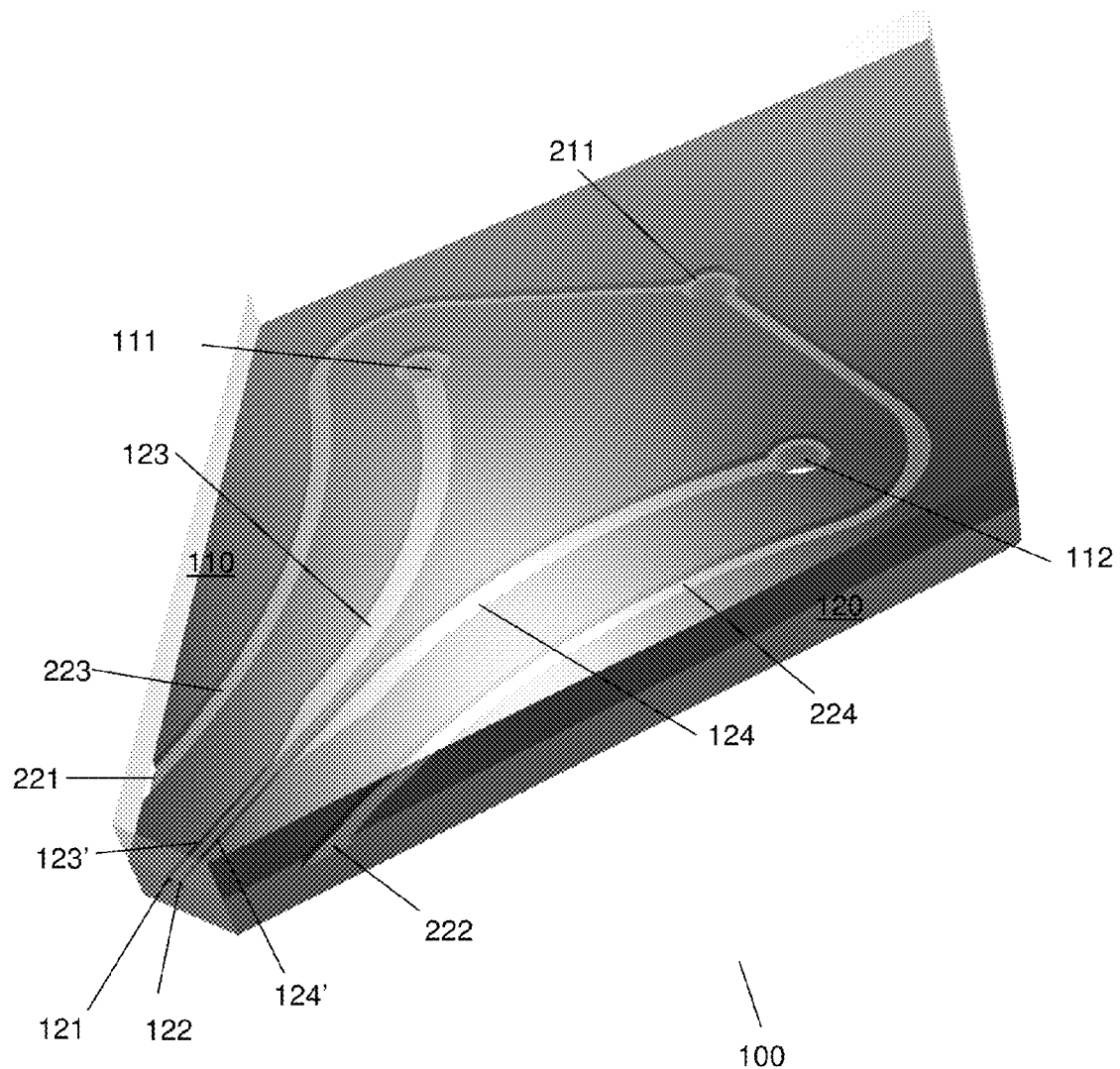
FIG. 4 is a 3D view of an MFP head according to another embodiment.

FIG. 4 is a 3D view of a MFP head, whose processing is provided with apertures 121, 122, 221, 222 and corresponding microchannels which are essentially similar to that of FIG. 2 or 3. Vias 111, 112 are provided on the cover layer 110. An additional via 211 is shown, which allows for relaying fluid communication to immersion channels 223, 224 (only one via is provided here, which feeds both immersion channels). Corresponding tubing ports can be provided (not shown). The channels have ends arranged such as to face the vias, as evoked earlier.

FIGS. 5-10 are schematic views of possible variants, where only the base layer 120 is shown. In all cases, microchannels extend up to a face of the base layer 120, preferably different faces. Corresponding apertures are formed at an end of the channels. Basically, such embodiments allow to skip an explicit fabrication of apertures. For example, microchannels are engraved as grooves spreading up to an edge (e.g., diced) of the base layer 120, and giving rise to apertures without additional machining required.

In addition, in each of the variants of FIGS. 5-10, one or more immersion apertures 221, 222, etc. are provided that allow dispensing immersion liquid in the vicinity of the injection/aspiration apertures 121, 122. The processing end of the head is made 'acute'. Owing to the set-up configurations, one may speak of "vertical" MFP heads. The depicted designs ensure that the region in close vicinity to the injection/aspiration apertures is immersed in immersion solution for e.g., undisturbed flow confinement of the processing liquid. Typically, immersion liquid apertures are larger than the injection/aspiration apertures. For example, the former are likely designed to dispense microliters of liquid while the later dispense picoliters. Incidentally, only the head face having the injection/aspiration apertures 121, 122 is to be polished, the large immersion liquid apertures need not be polished.

The depicted structures are easily fabricated. For improved yield in fabrication, one may fill wax in the channels to minimize clogging of debris generated during fabrication and packaging (dicing, polishing). In that respect, it can be realized that additional wax feed channels might be provided, which can be arranged such as to connect all microchannels on a MFP head. In addition, multiple MFP heads can be machined on a same substrate, which are all connected to a single 'wax distribution channel.' Wax can then be fed e.g., via a same feed port, such that molten wax creeps into all channels. Finally, wax can be left in the channel post-processing for packaging and shipping of the MFP heads (de-waxing is then easily achieved, as known in e.g., pathology applications).

Such structures are well suited for those applications that require slender and compact MFP heads (e.g. for endoscopy applications). Also, a small footprint of the MFP head will increase throughput in fabrication and reduce costs.

Figure 5:
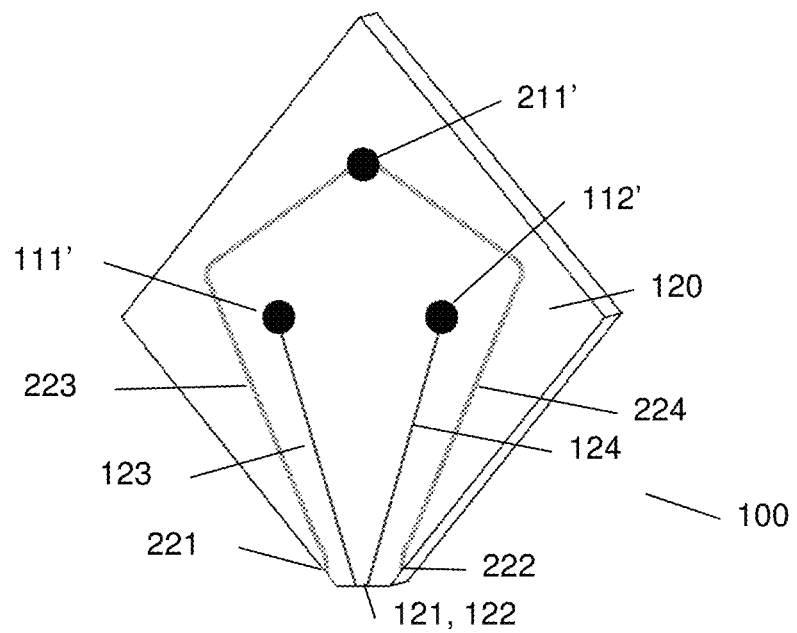
FIGS. 5-10 are schematic views of MFP heads, according to various embodiments.

FIG. 5 is a view corresponding essentially to the design of FIG. 4, besides features of the microchannel sections. Channel ends 111', 112', 211' are shown which correspond to vias 111, 112, 211 in FIG. 4.

Figure 6:
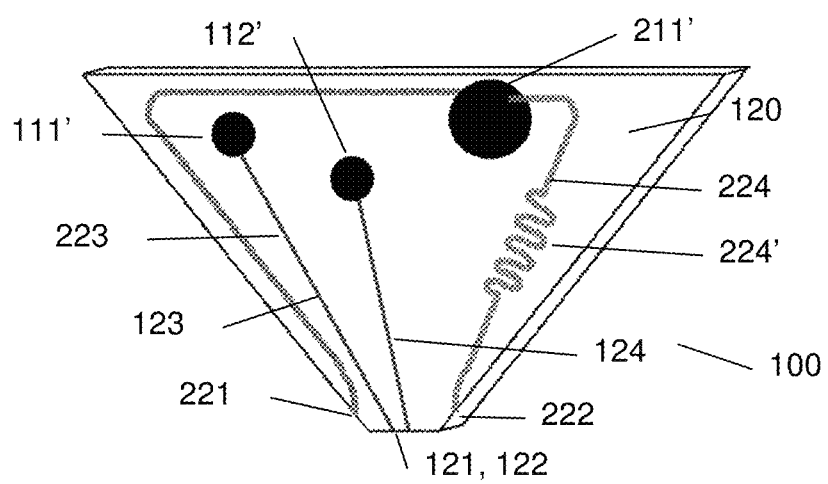

FIG. 6 relates to another, asymmetric design, which further involves asymmetric flow resistances, as symbolically denoted by reference 224'. In this regard, designing compact footprint MFP heads may lead to combine channels into a single path. This will also result in reduced interfaces. However, with compact structures, symmetry of the channels may need to be broken (as in FIG. 6), resulting in different liquid flow rates. There, providing additional hydraulic resistance compensators (e.g., different channels geometries along the flow path) may be helpful to restore equal resistances in the channels.

More generally, two microchannels may be designed such as to have distinct flow resistances. Flow resistances affect the flow rates of liquid in the different flow paths. The characteristic flow resistance of a structure can be defined as the ratio between the pressure applied to a liquid (assumed to be non-compressible) and the flow rate of the liquid in the structure. The flow resistance of a channel is primarily determined by its dimension and shape but other factors might also impact it. There is an analogy between flow resistances, flow rates and pressures and electrical circuits described using electrical resistances, current and electrical potentials: channels having equal shapes and lengths have equal flow resistances.

Figure 7:
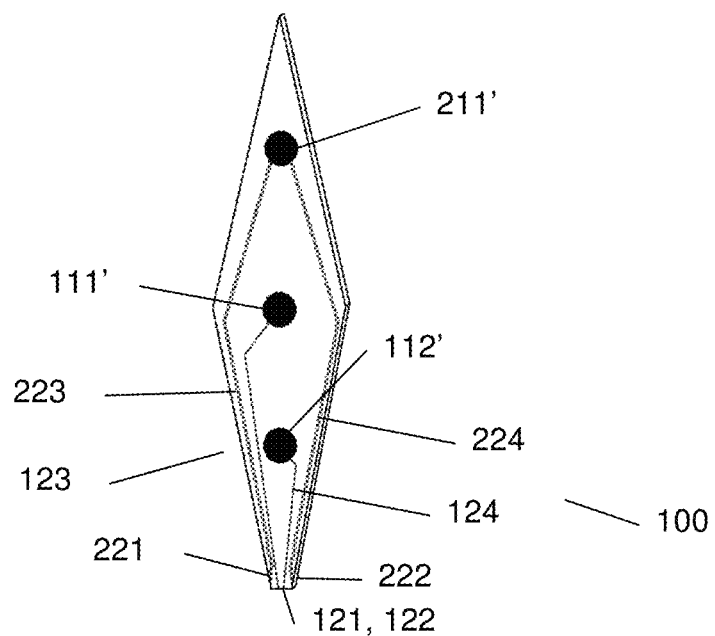

Hydraulic compensators (or channels with different flow resistances) are thus especially useful for pairs of asymmetric channels, as in the case depicted in FIG. 7. Here, the vertical MFP is designed to have a vertically reduced footprint, i.e. the vertical projection of the head onto the surface of interest is small and the head can access recessed regions of a surface of interest.

Figure 8:
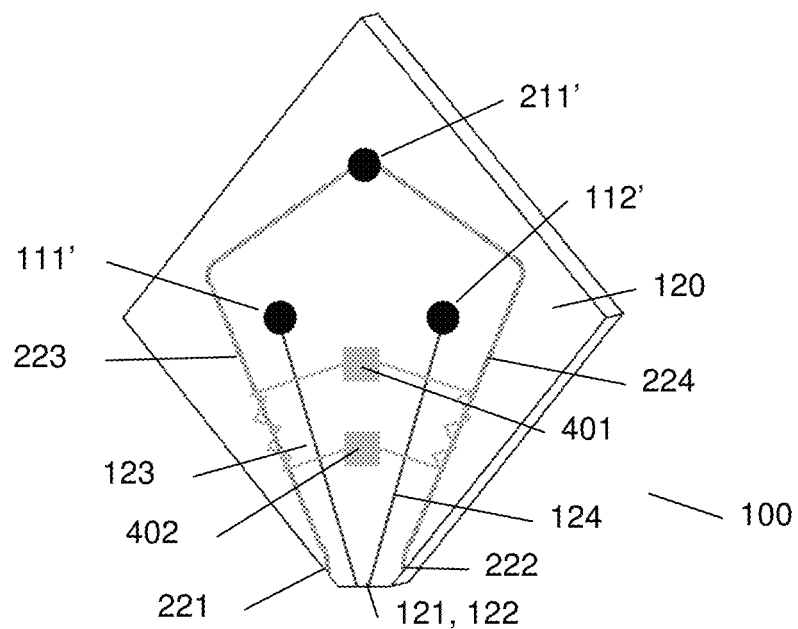

Next, in reference to FIG. 8, thermal elements 401, 402 might also be provided, to heat one or more microchannels, e.g., the immersion channels. Indeed, several biological applications (e.g. handling cells) may require a controlled temperature environment. This can be provided by the immersion liquid. To achieve this, one may pattern metal electrodes on e.g., a glass cover layer of the MFP head, using known processes to form electrodes. Thermal elements/electrodes can be used for heating and sensing temperature of the immersion liquid prior to dispensing it on the substrate. The electrodes can also be used to perform electrochemistry on the MFP heads, at the interface or on the surface of the processed substrate.

Figure 9:
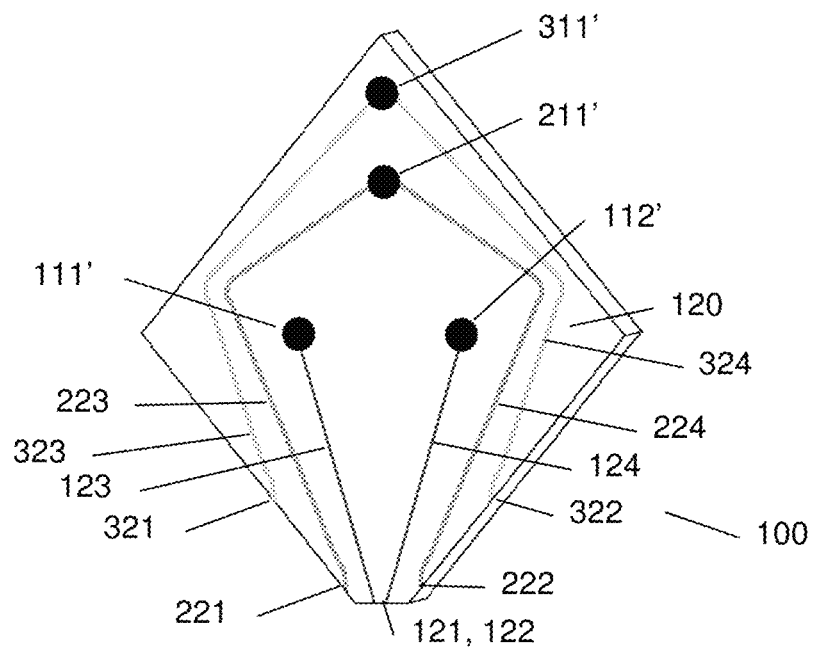

More than one or two immersion channels can be contemplated, as illustrated in FIG. 9. Here, additional immersion channels 323, 324 adjoin respective apertures 321, 322. Indeed, some applications may require multiple immersion liquids to confine the processing liquid. Possible scenarios are (a) when the processing solution is highly corrosive to the processed substrate, or (b) in medical application when dosing highly lethal drugs onto a small region of a tissue. In such cases, one may want to ensure minimum exposure of the adjoining tissue by shielding with multiple immersion liquids. For example, an outer immersion liquid can contain chemicals neutralizing very reactive chemicals species present in a processing liquid and the inner immersion liquid can act as a separator between the processing liquid and outer immersion liquids. Using this approach, multiple reactions can be performed at various (liquid) interfaces.

Figure 10:
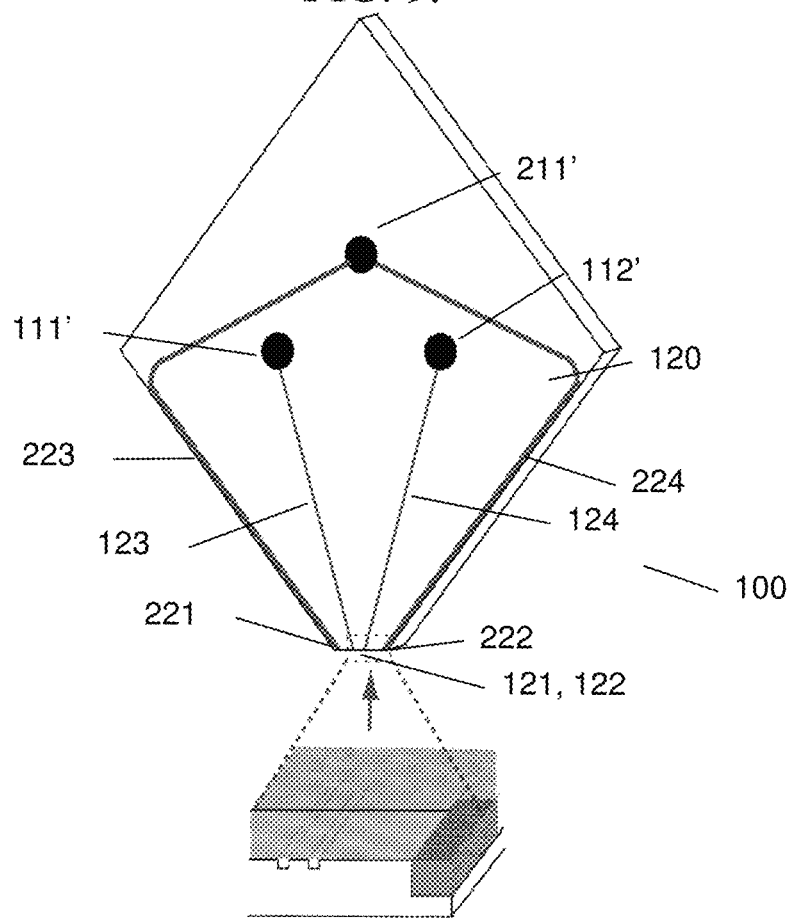

Finally, while most embodiments discussed herein have immersion channels provided on the same (e.g., upper) face of the base layer 120, it does not need to be systematically so. Immersion channels can for instance have portions residing on other faces of the base layer. In variant, immersion channels are not machined on the plain surface of the upper face of the base layer, but instead at edges thereof or still close to edges of the upper face, as illustrated in FIG. 10. This is especially useful for applications that need to minimize the immersion liquid footprint. One approach is thus to deliver the immersion liquid in close proximity to the injection/aspiration apertures 121, 122 using channels formed by making grooves 223, 224 along edges of the upper face of the head.

Several variants to the above embodiments can still be contemplated. For example, fabricating microchannels can be carried out such that a characteristic of the microchannel (i.e. the mean section) changes continuously along the channel. Hence, one may adjust the characteristic at stake by simply cutting the two layers 110, 120, e.g., after assembly of the layers.

Figure 11:
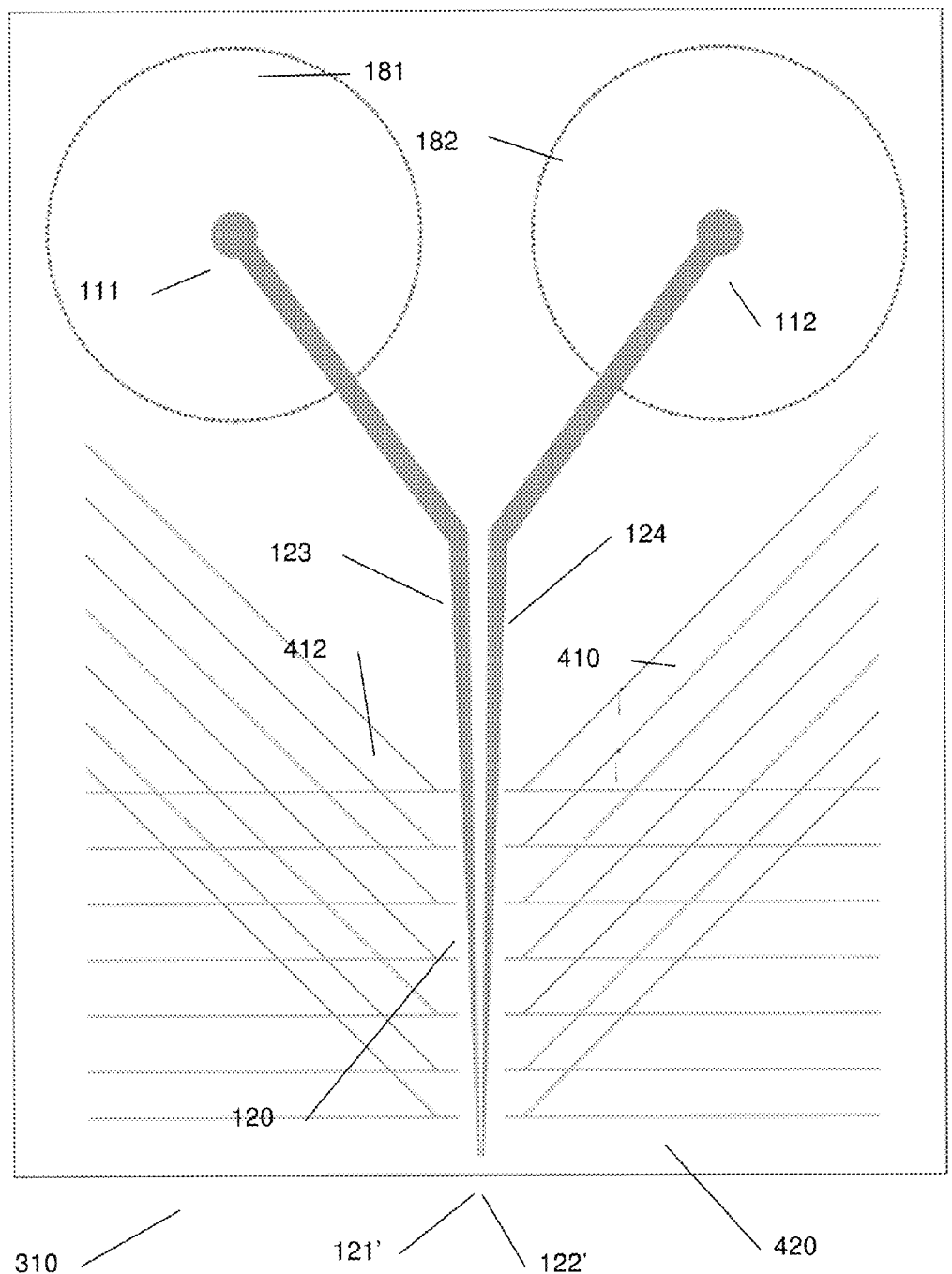
FIG. 11 is a schematic view of a base layer of a MFP head at an early stage of fabrication, according to an embodiment.

FIG. 11 illustrates this schematically. It actually represents a partial section view of the MFP layer, parallel to the mean plane of one of the layers 110, 120. It notably shows two microchannels 123, 124, whose sections decrease as they spread towards edge surface 310 (viewed in section). It further shows various cutting/dicing marks 410, 412, 420. Cutting can be for example carried out using a blade, a microtome, a dicing or sawing tool.

The edge surface 310 can hence be cut or ablated along any of the marks 420, and along any pair of marks 410, 412, resulting in various possible aperture sizes at the end of the microchannels. Reference numerals 121', 122' denote apertures as of before cutting.

In addition, the relative distance between microchannels 123, 124 (and/or 223, 224) may change as well, such that the relative distance between apertures as of after cutting can be simply adjusted.

Figure 12:
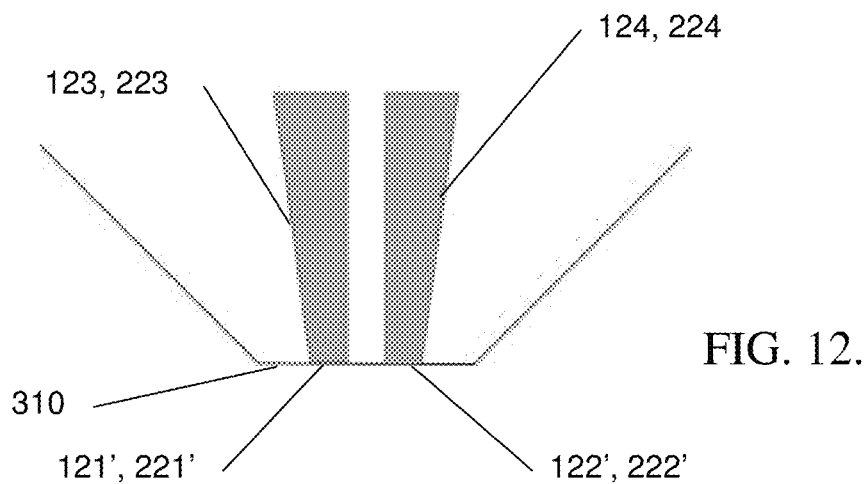
FIGS. 12-13 illustrate variants for the shapes of processing liquid microchannels, close to the dispensing end.

In a variant, only the dimensions of the apertures are changed by cutting the edge surface, as depicted in FIG. 12, while the minimal distance between two channels remains the same. Here, the shape of the sections of the microchannels is designed such that cutting the edge will primarily result in modifying the apertures size, while not substantially modifying their relative distance. A further variant would consist in solely adjusting the distance between apertures, while not modifying their dimensions.

Figure 13:
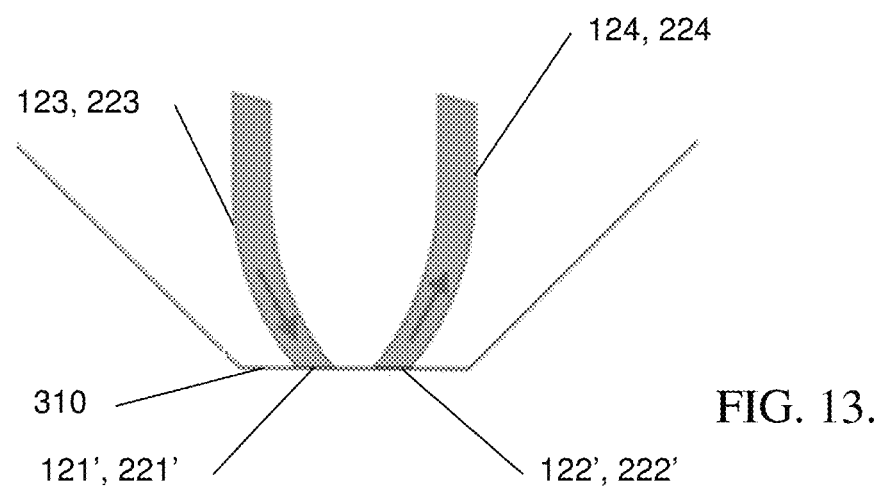

Even, a pair of microchannels can be engraved such as to present a desired curvature at the level of the edge surface 310, as illustrated in FIG. 13. Here, cutting the edge 310 would result in modifying the angle of incidence of the apertures. Hence, the angle of incidence of the fluid with respect to a sample surface can be modified. This notably impact the momentum of liquid ejected from and aspirated by the apertures, which may be useful in some applications.

More generally, one or more microchannels can be fabricated parallel to the upper face of the base layer 120, extending up to the edge 310, such that one characteristic thereof (or more) is changed along the microchannel. As evoked above, this characteristic could be a relative distance between microchannels, the orientation of flares of the microchannels or a mix thereof. As a result, cutting the edge 310 allows for adjusting characteristics of terminal apertures.

From the production point of view, this is advantageous inasmuch as only one design template for MFP layers 110, 120 can actually serve as a basis for obtaining various different final arrangements of apertures in MFP heads.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, instead of having pairs of ports, vias, and apertures, etc., one port/via can be provided to feed two or more microchannels. More generally, various combinations of port, microchannel, etc., can be contemplated. Also, while the term "layer" has been used, it should be understood that, e.g., a MFP base layer need not be "flat". For example, the base layer could be a stick, provided with microchannels grooved on the peripheral surface. The channels could then be closed with a concentric layer applied on top. The base layer does however not necessarily need to be closed by a second layer.

REFERENCES CITED

[1] Brody J P, Yager P, Goldstein R E and Austin R H 1996 Biotechnology at low Reynolds Numbers *Biophys. J.* 71 3430-3441

[2] Knight J B, Vishwanath A, Brody J P and Austin R H 1998 Hydrodynamic Focusing on a Silicon Chip: Mixing Nanoliter in Microseconds *Phys. Rev. Lett.* 80 3863-3866

[3] Squires T M and Quake S R 2005 Microfluidics: Fluid physics at the nanoliter scale *Rev. Mod. Phys.* 77 977-1026

[4] Kenis P J A, Ismagilov R F and Whitesides G M 1999 Microfabrication Inside Capillaries Using Multiphase Laminar Flow Patterning *Science* 285 83-85

[5] Derby B 2008 Bioprinting: Inkjet printing proteins and hybrid cell-containing materials and structures *J. Mater. Chem.* 18 5717-5721

[6] Kim K H, Moldovan N and Espinosa H D 2005 A Nanofountain Probe with Sub-100 nm Molecular Writing Resolution *small* 6 632-635

[7] Meister A, Liley M, Bruger J, Pugin R and Heinzelmann H 2004 Nanodispenser for attoliter volume deposition using atomic force microscopy probes modified by focused-ion-beam milling *Appl. Phys. Lett.* 85 6260-6262

[8] Ahmadzadeh H, Thompson L V and Arriaga E A 2005 On-column labeling for capillary electrophoretic analysis of individual mitochondria directly sampled from tissue cross sections *Anal. Bioanal. Chem.* 384 169-174

[9] Rodolfa K T, Bruckbauer A, Zhou D, Schevchuk A, Korchev Y E and Klenerman D 2006 Nanoscale Pipetting for Controlled Chemistry in Small Arrayed Water Droplets Using a Double-Barrel Pipet *Nano Lett.* 6 252-257

[10] Ying L, Bruckbauer A, Rothery A M, Korchev Y E and Klenerman D 2002 Programmable Delivery of DNA through a Nanopipet *Anal. Chem.* 74 1380-1385

[11] Meister A, Polesel-Maris J, Przybylska J, Studer P, Zambelli T, Liley M, Vörös J and Heinzelmann H 2008 Nanoscale dispensing in liquid environment of streptavidin on a biotin-functionalized surface using hollow atomic force microscopy probes *Proceedings of the Micro-and Nano-Engineering 2008 Conference—MNE 2008* in press

[12] Bruckbauer A, Zhou D, Ying L, Korchev Y E, Abell C and Klenerman D 2003 Multicomponent Submicron Features of Biomolecules Created by Voltage Controlled Deposition from a Nanopipet *J. Am. Chem. Soc.* 125 9834-9839

[13] Bruckbauer A, Ying L, Rothery A M, Zhou D, Shevchuk A I, Abell C, Korchev Y E and Klenerman D 2002 Writing with DNA and Protein Using a Nanopipet for Controlled Delivery *J. Am. Chem. Soc.* 124 8810-8811

[14] Juncker D, Schmid H and Delamarche E 2005 Multipurpose microfluidic probe *Nature Materials* 4 622-628

[15] Shiku H, Yamakawa T, Nahimoto Y, Takahashi Y, Torisawa Y, Yasukawa T, Ito-Sasaki T, Yokoo M, Abe H, Kambara H and Matsue T 2009 A microfluidic dual capillary probe to collect messenger RNA from adherent cells and spheroids *Anal. Biochem.* 385 138-142

[16] Queval A, Perrault C M, Qasaimeh M A, McKinney R A and Juncker D 2008 Design and fabrication of a PDMS microfluidic probe and perfusion chamber for microfluidic experiments with organotypic brain slices *Proceedings of μTAS 2008 Conference* 1663-1665

The invention claimed is:

1. A microfluidic probe head comprising:
a base layer and a cover layer, the base layer and cover layer collectively defining a front end and an opposing back end,
the base layer comprises:
a base layer top surface;
a base layer bottom surface opposing the base layer top surface;
a first side surface;
a second side surface extending from the first side surface toward the back end,
wherein the first side surface is arranged at the front end than the second side surface,
wherein the base layer top surface and the first side surface define a pair of processing liquid grooves, wherein at least a part of each of the pair of processing liquid grooves is formed on the base layer top surface, and an end of each of the pair of processing liquid grooves is formed at a first intersection of the first side surface and the base layer top surface, and
wherein the base layer top surface and the second side surface define an immersion liquid groove that is separate from the pair of processing liquid grooves, wherein at least a part of the immersion liquid groove is formed on the base layer top surface, and a an end of the immersion liquid groove is formed at a second intersection of the second side surface and the base layer top surface,
wherein the cover layer is connected to the base layer,
wherein the cover layer and the pair of processing liquid grooves of the base layer define a pair of processing liquid microchannels, and the cover layer and the end of the pair of processing liquid grooves of the base layer define a pair of processing liquid apertures, and
wherein the cover layer and the immersion liquid groove of the base layer define an immersion liquid microchannel, and the cover layer and the end of the immersion liquid groove of the base layer define an immersion liquid aperture.

2. The microfluidic probe head of claim 1,
wherein the cover layer comprises:
a cover layer top surface; and
a cover layer bottom surface opposing the cover layer top surface,
wherein the cover layer defines a via extending between the cover layer top surface and the cover layer bottom surface, and
wherein the cover layer bottom surface is connected to the base layer top surface such that the via is in fluid communication with one of the processing liquid microchannels and the immersion liquid microchannel,
wherein the microfluidic probe head further comprises:
a tubing port connected to the via from the cover layer top surface, wherein the tubing port is in fluid communication through the via with the one of the processing liquid microchannels and the immersion liquid microchannel.

3. The microfluidic probe head of claim 1,
wherein a dimension of sections of at least one of the processing liquid microchannels and the immersion liquid microchannel changes along a length of the at least one of the processing liquid microchannels and the immersion liquid microchannel.

4. The microfluidic probe head of claim 1, further comprising a thermal electrode formed on the cover layer, wherein the thermal electrode is configured to heat one or more of the processing liquid microchannels and the immersion liquid microchannel.

5. The microfluidic probe head of claim 1, wherein the base layer is symmetric with respect to an axis,
wherein the pair of processing liquid microchannels are asymmetrically configured with respect to the axis.

6. The microfluidic probe head of claim 1,
wherein the immersion liquid microchannel and at least one of the pair of processing liquid microchannels are configured to have different flow resistances.

7. A method of fabrication of fabricating a microfluidic probe head, comprising the steps of:
providing a base layer having a front end and an opposing back end, wherein the base layer comprises:
a base layer top surface;
a base layer bottom surface opposing the base layer top surface;
a first side surface;
a second side surface extending from the first side surface toward the back end, and wherein the first side surface is arranged at the front end than the second side surface;
forming a pair of processing liquid grooves in the base layer top surface and the first side surface, wherein at least a part of each of the pair of processing liquid grooves is formed on the base layer top surface, and an end of each of the pair of processing liquid grooves is formed at a first intersection of the first side surface and the base layer top surface;

forming an immersion liquid groove in the base layer top surface and the second side surface, wherein at least a part of the immersion liquid groove is formed on the base layer top surface, and an end of the immersion liquid groove is formed at a second intersection of the second side surface and the base layer top surface; and providing a cover layer connected to the base layer, wherein the cover layer and the pair of processing liquid grooves of the base layer define a pair of processing liquid microchannels, and the cover layer and the end of the pair of processing liquid grooves of the base layer define a pair of processing liquid apertures, and wherein the cover layer and the immersion liquid groove of the base layer define an immersion liquid microchannel, and the cover layer and the end of the immersion liquid groove of the base layer define an immersion liquid aperture.

\* \* \* \* \*